July 2, 1963     W. N. CATON     3,095,902

CORROSION RESISTANT VALVE

Filed March 6, 1961

INVENTOR
WALTER NATHANIEL CATON

Mead, Browne, Schuyler &
Beveridge, Attorneys

3,095,902
CORROSION RESISTANT VALVE
Walter Nathaniel Caton, 53 Pellisier Road, Putney, near Sydney, New South Wales, Australia
Filed Mar. 6, 1961, Ser. No. 93,753
2 Claims. (Cl. 137—554)

In many chemical, mining or other industrial processes it is frequently necessary to control the flow in pipes of corrosive liquids; and, particularly, when such a process is carried out in a more or less automatic or continuous manner it is desirable to use control valves which may be operated from a remote control station and which may provide at that control station an indication as to whether they are open or closed.

Unfortunately many materials, such as glass, industrial plastics materials, lead and the like, which may be well suited for use in valves of the kind under discussion because of their resistance to corrosion are not suitable for use in valve operating mechanisms because of their softness, lack of strength, difficulty of machining or like deficiencies; thus, it is usual to use corrosion resistant materials for those parts of a valve which must of necessity contact the liquid being controlled, and to rely on seals about a moving part, such as a valve spindle, to prevent that liquid reaching the operating mechanism.

Another requirement in valves for corrosive liquids is that they be thoroughly reliable in use and it has been found that the above mentioned seals are subject to wear or damage detrimental to the valve's reliability, accordingly the present invention has been devised to provide a simple, remotely operable corrosion resistant valve, which requires no liquid seals to operate on moving parts and wherein the valve body, through which liquid flows, is a corrosion resistant chamber, completely sealed apart from the liquid entry and exhaust ports.

The invention consists in a corrosion resistant valve comprising a valve body of non-magnetic, corrosion resistant material, said body incorporating a chamber, an exhaust duct leading from said chamber, a valve seat rimming an orifice at one end of said chamber and an inlet duct, leading to said orifice externally of said chamber; a plunger of non-magnetic corrosion resistant material slidable axially within said chamber; a magnetic core within and totally enclosed by said plunger; a valve head secured to or integral with said plunger able to close the valve by seating in a liquid tight manner against said valve seat and to open the valve by departing from that seat in consequence of axial movement of said plunger, and two solenoid coils outside said body encircling said chamber; said solenoid coils being adapted to act upon said core as an armature so as to close and hold closed, or open and hold open, said valve operation depending on which coil is energised for the time being.

An example of the invention is illustrated in the accompanying drawing, of which, FIG. 1 is a plan view of a valve according to the invention;

Figure 1:
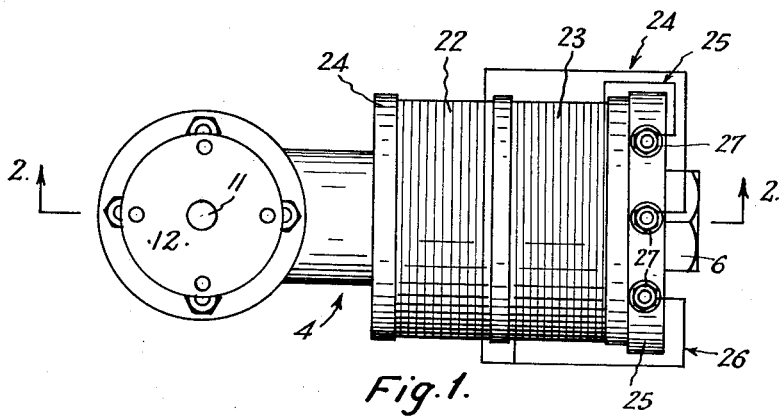
Figure 2:
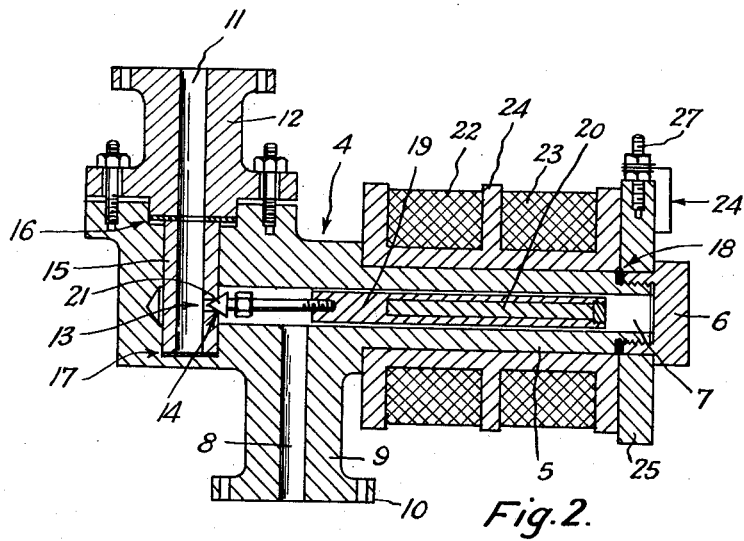
FIG. 2 is a sectional side elevation taken on line 2—2 in FIG. 1.

Referring to FIGS. 1 and 2, a valve body 4 may be made of any suitable corrosion resistant, non-magnetic material, for example, glass, porcelain, plastics, lead, lead-antimony alloy or like well known substances or alloys. The body 4 has a tubular portion 5 which together with an end cap 6 defines a cylindrical chamber 7. An exhaust duct 8 through a spigot 9 leads from the chamber 7. The spigot 9 may be provided with a flange 10 or other conventional means for securing the valve in a pipeline or the like.

An inlet duct 11, through a second flanged spigot 12, communicates with an orifice 13 opening into the chamber 7; and a valve seat 14 is formed around the rim of the orifice 13.

In the present example, replacement of the valve seat 14 is facilitated as it is formed in a tubular valve insert 15. The insert 15 is preferably of non circular cross-section and fits into a complementarily shaped recess in the valve body to ensure that the valve seat 14 is always correctly aligned. The insert 15 is held in position by studs or the like able to draw the spigot 12 firmly down against the insert 15.

Conventional corrosion resistant sealing gaskets (at 16, 17 and 18) may be used to prevent leakage from the valve.

A plunger 19 of a non-magnetic, corrosion resistant material, such as those mentioned earlier or hard-rubber or the like, is slidable axially within the chamber 7; the liquid to be controlled by the valve is relied upon to lubricate the plunger 19.

A magnetic core 20 is totally encased by the plunger 19. The core 20 may be of iron or tightly packed iron powder, but is preferably of electrical silicon steel in the form of a bundle of steel wires.

The plunger 19 carries a valve head 21 aligned with the valve seat, so that opening or closing of the valve may be effected by axial movement of the plunger 19. One or more grooves may extend along the plunger 19 to facilitate liquid flow past it as it moves within the chamber 7, or the chamber wall may be grooved for the same purpose.

Two solenoid coils 22 and 23 respectively, wound, for example, on a single former 24 are mounted upon the tubular body portion 5 and clamped in position by the end cap 6 and spacer 25. The position of the solenoids is such that when the "closing" solenoid 22 is energised, the core 20 in its effort to take up a position centrally placed in regard to the solenoid 22 (as well understood) moves the plunger 19 into the valve closed position (as illustrated) and holds it there; on the other hand when solenoid 22 is de-energised and the "opening" solenoid 23 is energised the valve is opened and held open. Electrical connections to the solenoids, indicated at 24, 25 and 26, may be brought out to terminal posts 27 a terminal box or the like and in the illustrated arrangement the spacer 25 is an insulator.

The solenoids 22 and 23 may be provided with a magnetic sheath to increase the force transmitted to the core 20, as well understood.

The solenoids are preferably energised by direct current, but, especially when the valve is included in a low pressure liquid line, alternating current may be used, and in this instance advantage may be taken of the voltage induced in the de-energised coil by leakage flux from the energised coil, to monitor the electrical continuity of whichever coil is not in use. For example, two incandescent lamps may be provided, each respectively connected in parallel with the solenoids 22 and 23. So long as both coils are sound one lamp will glow strongly and the other will glow weakly when one coil is energised and the relative brightness of the lamps will depend on which of the coils is energised, thus providing an indication both of valve position and coil soundness.

Figure 3:
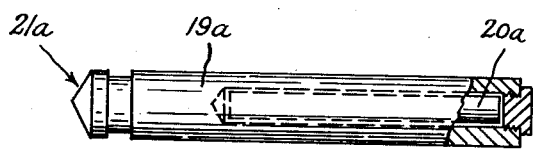
FIG. 3 is a partly sectioned side elevation of an alternative form of plunger and valve head.

FIG. 3 illustrates an alternative form of plunger comprising an outer cover 19a, a valve head 21a integral therewith and a magnetic core indicated at 20a. In other alternatives the plunger may be reduced to a relatively thin coating of plastics, rubber or the like upon a magnetic core which itself provides the requisite mechanical strength for the plunger.

I claim:
1. A corrosion resistant valve comprising a valve body of non-magnetic, corrosion resistant material, said body incorporating a chamber, an exhaust duct leading from said chamber, a female valve seat rimming an orifice at one end of said chamber and an inlet duct leading to said orifice externally of said chamber; a plunger of non-magnetic corrosion resistant material slidable axially within said chamber; a magnetic core within and totally enclosed by said plunger; a male valve seat secured to said plunger able to close the valve by seating in a liquid tight manner against said female seat and open the valve by departing from that seat in consequence of axial movement of said plunger; two solenoid coils with their adjacent ends in close proximity outside said body encircling said chamber and being adapted to act upon said core as an armature so as to close and open said valve depending on which coil is energized for the time being, and means to monitor the electrical continuity of the unenergized coil, said means being operated by the voltage induced in the unenergized coil by the leakage flux of the energized coil.

2. A corrosion resistant valve comprising a valve body of non-magnetic, corrosion resistant material, said body incorporating a chamber, an exhaust duct leading from said chamber, a female valve seat rimming an orifice at one end of said chamber and an inlet duct leading to said orifice externally of said chamber; a plunger of non-magnetic corrosion resistant material slidable axially within said chamber; a magnetic core within and totally enclosed by said plunger; a male valve seat secured to said plunger able to close the valve by seating in a liquid tight manner against said female seat and open the valve by departing from that seat in consequence of axial movement of said plunger; two solenoid coils with their adjacent ends in close proximity outside said body encircling said chamber and being adapted to act upon said core as an armature so as to close and open said valve depending on which coil is energized for the time being, and means to indicate the continuity of said coils and the position of the valve comprising two electric lamps respectively connected in parallel with said solenoid coils.

References Cited in the file of this patent
UNITED STATES PATENTS

| | | |
|---|---|---|
| 1,021,681 | Jennings | Mar. 26, 1912 |
| 1,644,171 | Caldwell | Oct. 4, 1927 |
| 2,034,272 | Schroeder | Mar. 17, 1936 |
| 2,515,029 | Almond | July 11, 1950 |
| 2,619,116 | Ralston | Nov. 25, 1952 |
| 2,688,462 | Barbehenn | Sept. 7, 1954 |
| 2,727,715 | Tuthill | Dec. 20, 1955 |

FOREIGN PATENTS

| | | |
|---|---|---|
| 789,251 | France | Apr. 12, 1935 |